Dec. 30, 1969     S. E. McCLINTOCK     3,487,359
STOP AND TURN INDICATOR FOR AN AUTOMOBILE
Filed Oct. 31, 1966
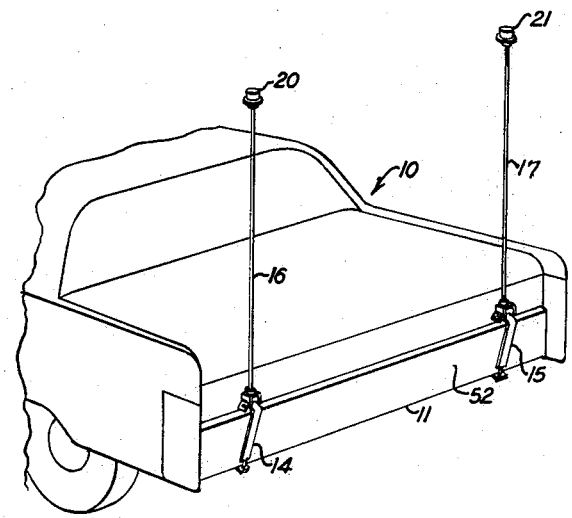
FIG. 1
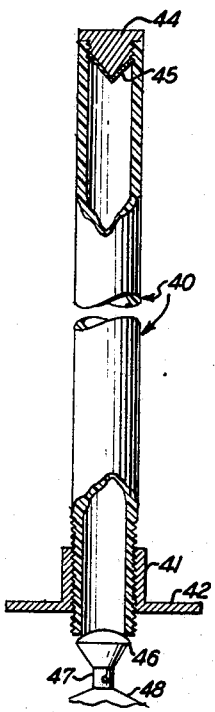
FIG. 3
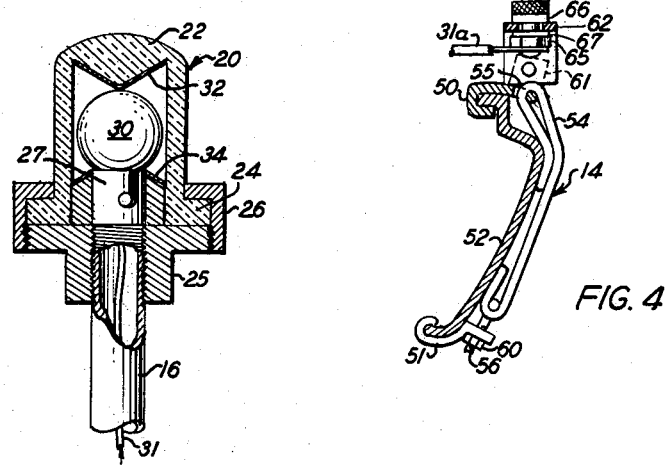
FIG. 2
FIG. 4
INVENTOR
SHERMAN E. McCLINTOCK
BY
*Mason, Mason & Albright*
ATTORNEYS

United States Patent Office 3,487,359
Patented Dec. 30, 1969

3,487,359
STOP AND TURN INDICATOR FOR AN AUTOMOBILE
Sherman E. McClintock, 538 Clayton St., Orlando, Fla. 32804
Filed Oct. 31, 1966, Ser. No. 590,863
Int. Cl. B60q 1/00
U.S. Cl. 340—87               4 Claims

ABSTRACT OF THE DISCLOSURE

Stop and turn indicators mounted on tubes extending vertically from the vicinity of each rear fender of an automobile to a height substantially above the top of the automobile. Each of the indicators has a transparent housing and an inverted cone reflector mounted above a light contained in the housing adapted to concentrate the light radiation in a horizontal direction simultaneously 360° around the indicator.

BACKGROUND AND SUMMARY OF THE INVENTION

This invention relates to stop and turn indicators for an automobile and more particularly to such indicators which will be visible both to the driver of the vehicle involved and to other operators of vehicles and pedestrians at all points and for a considerable distance about the vehicle concerned.

With contemporary automobiles, the rear lights include a stop light and a turn indicator light. The stop light is responsive to the brakes of the automobile and informs automobile drivers behind that the brakes are being applied, whereas the turn indicator lights are responsive to controls within the automobile to signal that a turn is intended. There are usually additional turn indicator lights in the front and also on the dashboard of the automobile, the latter to inform the driver that his turn indicators are operating. These systems have two serious drawbacks. One is that frequently the brake lights or the turn indicator lights will burn out without the operator of the vehicle being conscious of the same for a considerable length of time, thus adding to the danger to himself and others on the highway. The other is that the positions of the lights are such that their view if often obstructed to operators of other automobiles by intervening automobiles with the result that multiple accidents may occur on crowded turnpikes because the operators learn too late of emergency conditions developing ahead.

It is a major object of this invention to provide a practical solution for the foregoing problems by, in effect, raising the turn and stop indicator signals to a position whereby they can be seen in a 360-degree arc about the automobile, and by designing such indicators so that they are more likely to come to the attention of other operators despite obstructions as might otherwise exist due to intervening vehicles and the like.

The invention has advantages in that it is inexpensive to manufacture, does away with the necessity of having turn indicators at both the front and rear of an automobile as well as within the automobile itself, and provides an automatic flasher which is readily available in the event of a breakdown on the highway.

BRIEF DESCRIPTION OF THE DRAWINGS

Other objects, adaptabilities and capabilities will appear as the description progresses, reference being had to the accompanying drawings, in which:

FIGURE 1 shows in perspective the rear end of an automobile with indicators in accordance with the invention attached;

FIGURE 2 is a cross-sectional view of one of the indicators shown in FIG. 1;

FIGURE 3 is a fragmentary and broken view in partial cross section showing a modification of the indicator in accordance with the invention; and FIGURE 4 is a cross-sectional view of a bumper mount for an indicator in accordance with the invention.

DESCRIPTION OF THE PREFERRED EMBODIMENTS

Referring now to the drawings, FIG. 1 discloses the rear part of an automobile 10 which includes a rear bumper 11. A pair of bumper mounts 14 and 15 are secured to the bumper 11 and extending from each are similar tubular members 16 and 17. Similar light-emitting members 20 and 21 are mounted on the upper ends of the tubular members 16 and 17. As shown in cross section in FIG. 2, the light-emitting member 20 includes a glass or translucent plastic guard 22 which is a suitable color such as amber. The guard member 22 includes in its lower part a flange 24. A flange member 25 is secured to the top of the tubular member 16 by threading or other suitable means. The flange member 25 is further threaded in its outer periphery to receive a bushing 26 which cooperates with flange 24 to secure the guard member 22 in place. A light socket 27 is secured on the upper end of the tubular member 16 which receives a light bulb 30. Wire 31 which is appropriately connected to the light socket 27 extends downwardly through the tubular member 16 from whence it is connected to the regular stop light and turn indicator circuits in an appropriate manner as will be known to those skilled in the art.

It is important that the light emitted from light bulb 30 be concentrated in a horizontal direction in a 360° arc about the indicators insofar as possible. This can be accomplished by including a reflective portion 32 at the interior top portion of the guard member 22 and a further reflective portion 34 in the lower portion of the guard member 22. The reflective portions 32 and 34 are preferably treated to enhance their reflective qualities. While portions 32 and 34 are shown as part of the guard member 22 in FIG. 2, separate parts may be used for this purpose.

The tubular member 16 and the flange member 25 are preferably a metal or plastic which has substantial strength for its weight. It has been found that the weight of members 20 and 21 should be minimal to prevent vibration due to movement of the automobile. The flange member 25 and tubular member 16 may be composed of a translucent plastic in which case the tubular members may be also visible when light 30 is on. This is advantageous since the members 20 and 21 are about one foot above the top of the automobile and will not normally be visible through the rear vision mirror of the automobile to apprize the driver of the operating conditions of the stop light and turn indicators.

It will be appreciated that with the turn indicator disclosed herein, it is not necessary to equip an automobile with further turn indicators in the front portion of the automobile or on the dashboard since the turn indicators are readily visible to the driver, particulary at night.

Properly designed, as shown herein, each member 20 and 21 is a source of concentrated light which can be seen at a considerable distance by observers in any direction. FIGURE 3, however, shows a modified embodiment in which instead of giving a concentrated point source of light gives the observer a vertical line of light visible about a 360° arc. This is advantageous inasmuch as frequently operators of following automobiles can see neither the normal brake lights nor indicators such as members 20 and 21 due to intervening vehicles, whereas tubular members such as 16 and 17 may be seen through the rear windows and windshields of the forward automobiles. Also, the vertical line of light is distinctive and therefore is much less likely to be mistaken for the light of an ambulance or a similar emergency vehicle. However, a much stronger light is required to give distance visibility as provided by members 20 and 21.

In FIGURE 3, the indicator 40 comprises a tubular translucent member which is threadably received in its lower end by coupling 41 rigidly attached to an automobile fender 42, or other appropriate portions of the automobile. A top part 44 is threadably secured to the upper terminal of the indicator 40. Reflective portions 45, which coincide with a cone, act to concentrate a greater density of light emission from the upper terminal of the indicator 40. A directed beam of light supplied by light bulb 46 is received by socket 47 which is secured to an appropriate automobile part 48. The light bulb 46 is appropriately connected to the brake and turn indicator signal circuits of the automobile so as to indicate the braking condition of the automobile or a turn signal, as appropriate.

If desired, indicators such as members 20 and 21 may be mounted upon the indicator 40, providing, in effect, a pair of indicators on each side of the automobile for added safety.

In the embodiment of FIGURES 1 and 2, the indicators are mounted on bumper mounts 14 and 15 whereas the indicator 40 of FIGURE 3 is mounted directly on the automobile. The latter type of mounting is preferred. However, it will be appreciated that unless provision is made for coupling 41 or the like when the automobile is manufactured, external mounting will often be more convenient. It should also be understood that to the extent tubular members 16 and 17 may be conductive, they can also be employed as radio antennas.

Bumper mounting 14 is in cross section in FIGURE 4. It comprises an upper bumper clamp 50 and a lower bumper clamp 51 which hook around the upper and lower portions of the bumper part 52, respectively. A steel strap 54 fits through a slot 55 in the upper bumper clamp 50 and is secured to the lower bumper clamp 51 by means of a bolt 56 which engages a nut 60. By tightening the nut 60 on bolt 56, mounting 14 is secured firmly to the bumper part 52, the strap 52 being in tension. Extending upwardly from upper clamp 50 are a pair of projections 61 which have rigidly connected thereto in a selective angular relationship an inverted U-shaped bracket 62. The tubular member 16 is received through a hole in bracket 62 and is secured thereto by nuts 64 and 65, above and below bracket 62, which threadably engage tubular member 16, and are spaced from bracket 62 by lock washers 66 and 67. A wire 31a conductively leads from wire 31 to the appropriate blinker and stop light connection. A bumper mount 14 constructed in accordance with the foregoing secures the base of the tubular member 16 rigidly to the bumper 52.

Having thus described my invention, what I claim as new and desire to secure by Letters Patent of the United States is:

1. A stop and turn indicator for an automobile which comprises: a pair of vertically extending tubular members, one of said vertically extending tubular members connected to and extending from the right side of the automobile and the other of said vertically extending tubular members connected to and extending from the left side of the automobile, both of said vertically extending tubular members terminating substantially higher than the top of the automobile, light-emitting means connected to the top of each of said vertically extending tubular members, each of said light-emitting means radiating a substantial portion of its light simultaneously in all substantially horizontal directions therefrom, said light-emitting means operatively connected with the stop light circuit and the turn indicator circuit of the automobile, said light-emitting means comprising a light bulb, a transparent cylindrical casing surrounding said light bulb, reflective means substantially coinciding with the surface of an inverted cone included in said casing and adapted to reflect light radiating from said light bulb 360° in a substantially horizontal direction, clamping means at the base of said tubular members for clamping to the bumper of an automobile, said tubular members rigidly connected to said clamping means, said clamping means including upper and lower clamp parts for hooking onto the automobile bumper and a strap therebetween, a bracket firmly connected to said upper clamp part in a selective angular relationship, said tubular member extending from said bracket.

2. An indicator in accordance with claim 1 wherein said reflective means is an integral part of said casing.

3. An indicator in accordance with claim 1, wherein said tubular member is composed of translucent material.

4. An indicator in accordance with claim 1, wherein said vertically extending members are connected to the rear of the automobile.

References Cited

UNITED STATES PATENTS

| 2,338,748 | 1/1944 | Watkiss | 340—87 |
|---|---|---|---|
| 2,832,059 | 4/1958 | Adler | 340—50 X |
| 1,333,551 | 3/1920 | Larkin | 340—98 |
| 1,771,817 | 7/1930 | Ragsdale | 340—102 |
| 2,675,545 | 4/1954 | Wolper | 340—84 X |
| 2,975,401 | 3/1961 | Shupe | 340—102 X |
| 3,108,277 | 10/1963 | Thomas. | |
| 3,143,722 | 8/1964 | Murch | 340—84 |
| 3,213,419 | 10/1965 | Stults | 340—84 X |

JOHN W. CALDWELL, Primary Examiner

M. R. SLOBASKY, Assistant Examiner

U.S. Cl. X.R.

240—8.1; 340—50, 102